United States Patent
Yoshida

(10) Patent No.: US 6,289,168 B2
(45) Date of Patent: *Sep. 11, 2001

(54) VIDEO TAPE RECORDER WITH A FUNCTION OF CONTROLLING A CHARACTER DISPLAY

(75) Inventor: Noboru Yoshida, Daito (JP)

(73) Assignee: Funai Electric Co., Inc., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/871,625

(22) Filed: Jun. 9, 1997

Related U.S. Application Data

(63) Continuation of application No. 08/439,771, filed on May 12, 1995.

(30) Foreign Application Priority Data

May 12, 1994 (JP) .................................................... 6-98310

(51) Int. Cl.$^7$ ................................................ H04N 5/91
(52) U.S. Cl. ............................................. 386/68; 386/95
(58) Field of Search ........................... 386/4, 8, 68, 46, 386/95, 108, 125, 126, 61, 48, 84; 348/461, 468, 464; 360/18, 20, 21

(56) References Cited

U.S. PATENT DOCUMENTS

| | | | |
|---|---|---|---|
| 4,409,626 | * 10/1983 | Ferguson et al. | 386/84 |
| 4,418,364 | * 11/1983 | Wine | 386/48 |
| 4,477,841 | * 10/1984 | Chen et al. | 386/95 |
| 4,802,023 | * 1/1989 | Williams | 386/61 |
| 5,299,006 | * 3/1994 | Kim | 348/571 |
| 5,457,542 | * 10/1995 | Kim | 358/310 |
| 5,477,274 | * 12/1995 | Akiyoshi et al. | 348/468 |
| 5,659,368 | * 8/1997 | Landis | 348/467 |

FOREIGN PATENT DOCUMENTS

| | | |
|---|---|---|
| 7-95521 | 4/1995 | (JP) . |
| 7-226907 | 8/1995 | (JP) . |

OTHER PUBLICATIONS

Microsoft Press Computer Dictionary (2nd Edit), p. 334 (including the Cover Pages) 1994.*

* cited by examiner

Primary Examiner—Wendy R. Garber
Assistant Examiner—Aung S. Moe
(74) Attorney, Agent, or Firm—Bacon & Thomas

(57) ABSTRACT

A video tape recorder capable of reproducing a video tape on which a character multiplex signal is recorded. In the video tape recorder, when a video tape recorder unit reproduces the video tape, a character signal generator generates a character display signal based on the character multiplex signal. When the video tape recorder unit is transferred from the reproduction operation to a pause operation, the character signal generator continues generating the character display signal which has been generated immediately before the transfer to the pause operation.

4 Claims, 3 Drawing Sheets

VIDEO TAPE RECORDER WITH A FUNCTION OF CONTROLLING A CHARACTER DISPLAY

This application is a continuation of application Ser. No. 08/439,771, filed May 12, 1995.

BACKGROUND OF THE INVENTION

1. Field of the Invention

The invention relates to a video tape recorder (VTR) with a function of controlling a character display, capable of reproducing a video tape on which a character multiplex signal or teletext signal is recorded.

2. Description of the Related Art

A closed caption system which enables an aurally handicapped viewer to read speeches by means of characters superimposed on a broadcasting screen uses caption information multiplexed in the 21st scanning line of each frame.

In an apparatus for superimpose-displaying such caption information, the caption information is extracted based on a signal indicative of the 21st scanning line in a received video signal. With using a sampling clock signal which is synchronized in phase with a clock run-in signal in the extracted caption information, data codes in the caption information are sampled. Such data codes include character codes indicating characters, and control codes indicating a display control. In order to identify these codes, therefore, the apparatus is provided with a data decoder which decodes data codes. Furthermore, the apparatus is provided with a display signal generator which generates a display signal for a character display synchronized with the scanning timing of a CRT.

When the data decoder identifies a data code as a character code, the character code is written into a video random access memory (RAM) in the display signal generator, and the corresponding character is superimpose-displayed. When a data code is identified as a control code, the display signal generator controls the scroll of the display, the change of display colors, etc. in accordance with the contents of the control code.

Such an apparatus is configured so that, when a video signal in which caption information is not multiplexed is received, the superimpose display is erased, because of the following reason. When no caption information is received, the contents of the video RAM in the display signal generator are not defined. Even when a superimpose display is conducted, therefore, the displayed contents have no meaning.

In some cases, a video tape storing a video signal in which caption information is multiplexed is subjected to a reproduction process, and a superimpose displayed in the reproduction is used in a study of a language. In such cases, if the change of the contents of the superimpose display can be disabled at an arbitrary time, it is very convenient because the superimpose display can be read repeatedly. When the reproduction operation of the video tape is paused in order to disable the change of the contents of a superimpose display, however, the reproduction head cannot correctly reproduce information for one frame, and reproduces information in which information of the target track is mixed with that of an adjacent track or tracks. Consequently, a reproduced signal lacks caption information. Hence, the data decoder judges that caption information is not multiplexed, and instructs the display signal generator to erase a superimpose display. This produces a problem in that, with respect to a superimpose display, the change of the contents of the display cannot be disabled arbitrarily.

SUMMARY OF THE INVENTION

The invention has been made in order to solve the problem. It is an object of the invention to provide a video tape recorder with a function of controlling a character display, in which, when the reproduction operation of a video tape is to be paused, a control is conducted so as not to erase a character display, whereby the change of the contents of a superimpose display due to a character multiplex signal can be disabled at an arbitrary time.

In order to attain the above object, the invention provides a video tape recorder with a function of controlling a character display, including: a video tape recorder unit for reproducing a video tape on which a character multiplex signal is recorded; a character signal generator for generating a character display signal based on the character multiplex signal reproduced by the video tape recorder unit; and a control unit, when the video tape recorder unit is transferred from a reproduction operation to a pause operation, for causing the character signal generator to generate a character display signal which has been generated immediately before the transfer to the pause operation.

DETAILED DESCRIPTION OF THE PREFERRED EMBODIMENTS

Hereinafter, embodiments of the invention will be described with reference to the drawings.

Figure 1:
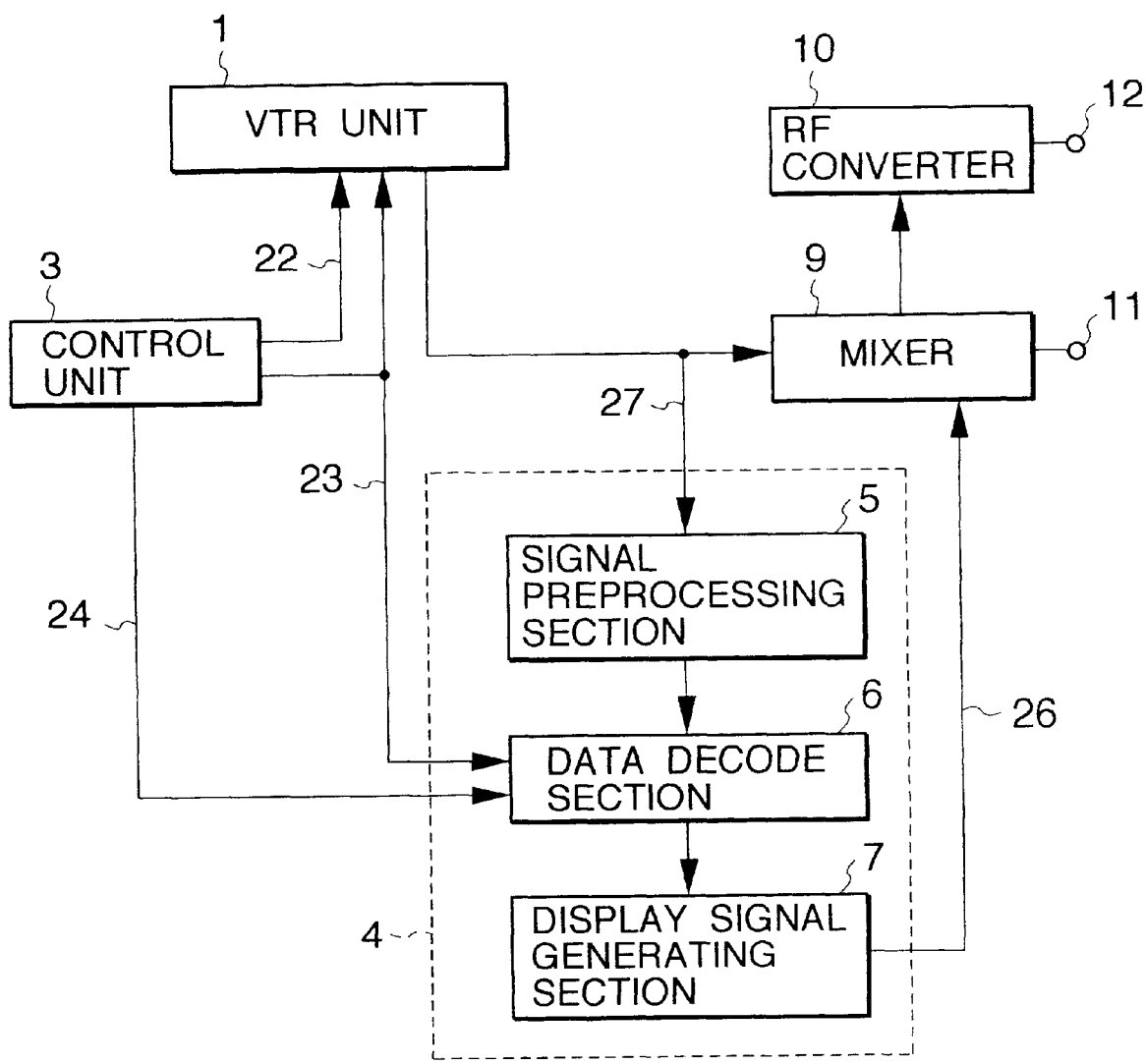
FIG. 1 is a block diagram showing the structure of a video tape recorder with a function of controlling a character display according to a first embodiment of the invention.

FIG. 1 is a block diagram showing the structure of a video tape recorder with a function of controlling a character display according to a first embodiment of the invention.

In the figure, the video tape recorder includes a video tape recorder (VTR) unit 1, a control unit 3, a character signal generator 4, a mixer 9, and a radio frequency (RF) converter 10.

The VTR unit 1 includes a tuner, a recording/reproducing head, a video tape driving device, a recording/reproducing circuit, etc. In other words, the VTR unit 1 is configured as a unit which records a video signal on a video tape and reproduces a video tape on which a video signal is recorded. During a reproduction operation, a reproduced video signal 27 is sent to the character signal generator 4 and the mixer 9.

The character signal generator 4 is a unit which detects caption information from a character multiplex signal in which the caption information is multiplexed as a character signal, and generates a character display signal 26 from the detected caption information. The character signal generator 4 includes a signal preprocessing section 5, a data decode section 6, and a display signal generating section 7.

The signal preprocessing section 5 is a section which, based on the video signal 27, generates signals such as a clock signal synchronized in phase with a clock run-in signal in caption information, and a signal indicating the timing of the 21st scanning line in which caption information is multiplexed, and clamps the video signal 27 at a fixed level. The generated signals and the video signal clamped at the fixed level are sent to the data decode section 6.

Based on the clock signal synchronized in phase with the clock run-in signal, the signal indicating the timing of the 21st scanning line, and the like, the data decode section 6 reads out 16-bit data codes in caption information, from the video signal clamped at the fixed level. The data decode section 6 functions also as a section which decodes the read out data codes and sends various control codes and character codes to the display signal generating section 7.

The display signal generating section 7 functions as a section which processes the control codes and character codes supplied from the data decode section 6, thereby generating the character display signal 26 for displaying a closed caption.

The mixer 9 is a unit which mixes the video signal 27 supplied from the VTR unit 1 and the character display signal 26 supplied from the display signal generating section 7 and outputs the mixed signal from a terminal 11. The RF converter 10 is a unit which converts the mixed signal supplied from the mixer 9 into an RF signal in a predetermined format and outputs the RF signal from a terminal 12. A television receiver (not shown) is connected to the terminal 11 or 12.

The control unit 3 is a unit which controls the VTR unit 1 and the character signal generator 4. Specifically, the control unit 3 controls the operation of the VTR unit 1 by means of a control signal 22, and the operation of the data decode section 6 by means of a control signal 24, thereby controlling the display or non-display of a closed caption. The control unit 3 outputs a pause signal 23 to set the VTR unit 1 to a pause operation mode and also to inform the data decode section 6 of the fact that the VTR unit 1 enters the pause operation mode.

Figure 2:
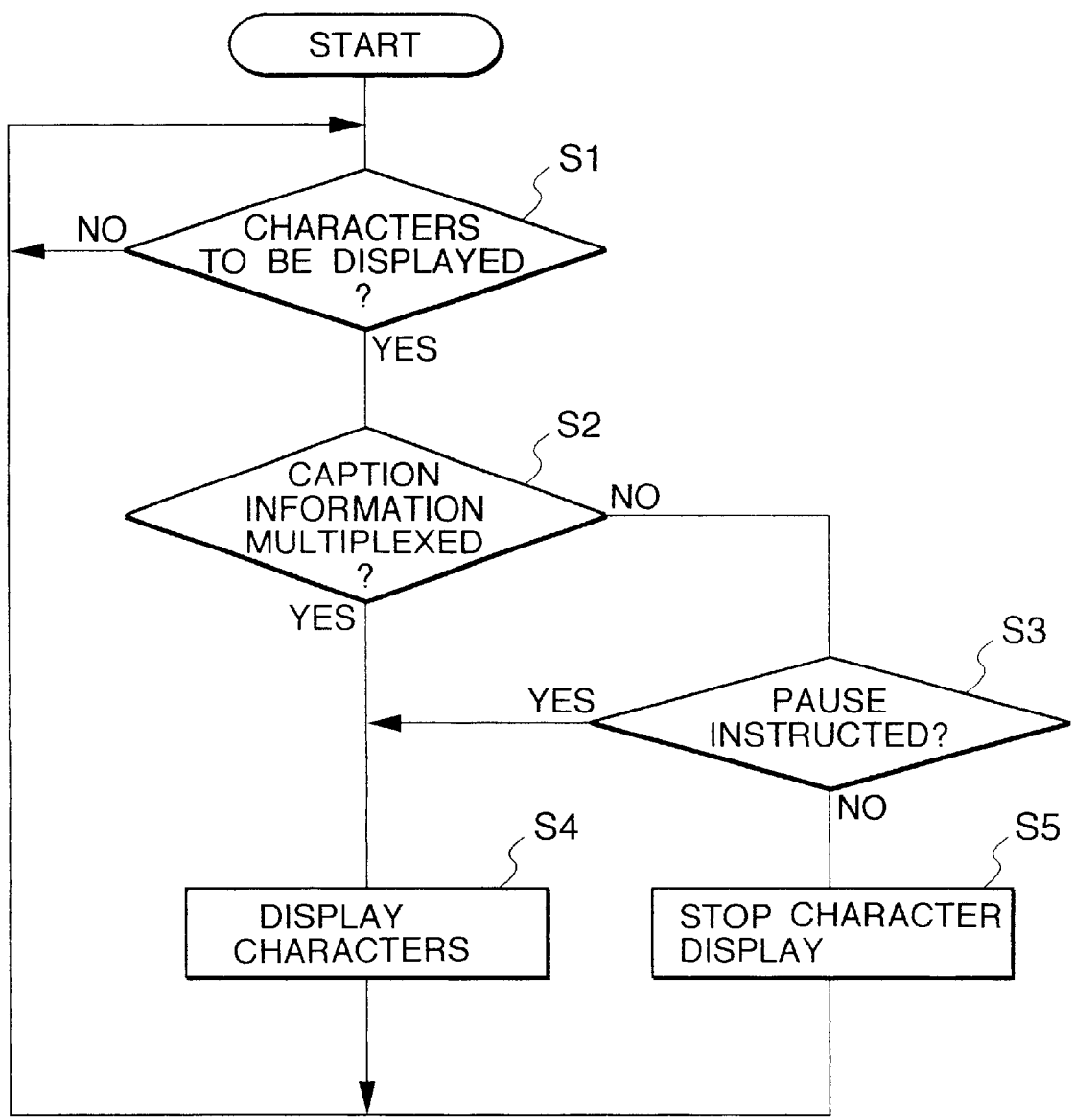
FIG. 2 is a flowchart showing the operation of the video tape recorder of the first embodiment.

FIG. 2 is a flowchart showing the operation of the video tape recorder of this embodiment. Referring to the figure as required, the operation of the video tape recorder will be described.

In the reproduction of a video tape, when the control signal 24 indicates that a closed caption is not to be displayed, the data decode section 6 gives the display signal generating section 7 a control code indicating stoppage of the generation of the character display signal 26, so that a closed caption is prevented from being displayed (step S1).

Next, the case where the control signal 24 indicates that a closed caption is to be displayed will be described.

It is now assumed that a video signal in which caption information is not multiplexed is recorded on a video tape currently reproduced by the VTR unit 1. In other words, it is assumed that the video signal 27 in which caption information is not multiplexed is output from the VTR unit 1.

In this situation, since it is impossible to read out data codes, the data decode section 6 judges that caption information is not multiplexed, and supplies the control code of disabling the display to the display signal generating section 7. This causes the display signal generating section 7 to stop the generation of the character display signal 26. As a result, the video signal reproduced by the VTR unit 1 is output as it is from the terminal 11 of the mixer 9. (steps S1 to S3 and S5). Also, the RF signal corresponding to the video signal is output from the terminal 12 of the RF converter 10.

Next, it is assumed that a video signal (character multiplex signal) in which caption information is multiplexed is recorded on a video tape reproduced by the VTR unit 1. In other words, it is assumed that the video signal (character multiplex signal) 27 in which caption information is multiplexed is output from the VTR unit 1.

In this situation, data codes can be read out according to the signal from the signal preprocessing section 5. Therefore, the data decode section 6 decodes the read out data codes, and supplies control codes and character codes to the display signal generating section 7 in accordance with the result of the decoding. Consequently, the display signal generating section 7 generates the character display signal 26 corresponding to the control codes and the character codes, and these codes are supplied to the mixer 9. In the mixer 9, as a result, the video signal 27 reproduced by the VTR unit 1 and the character display signal 26 generated by the display signal generating section 7 are mixed, and the mixed signal is output from the terminal 11 (steps S1, S2 and S4). Also, the RF signal corresponding to the mixed signal is output from the terminal 12 of the RF converter 10.

During the above-described operation, instructions for a pause are externally input to the control unit 3 for the sake of repeatedly reading a superimpose display. In response to the input of the instructions for a pause, the control unit 3 instructs the VTR unit 1 and the data decode section 6 to conduct a pause operation, by means of the pause signal 23. The VTR unit 1 which receives the pause instructions is transferred from the reproduction operation to the pause operation, and outputs the video signal 27 in which signals of adjacent tracks are mixed with each other, to the character signal generator 4 and the mixer 9. Since signals of adjacent tracks are mixed with each other, the video signal is a signal in which caption information is not multiplexed.

In this situation, the video signal 27 in which caption information is not multiplexed is supplied to the signal preprocessing section 5. Therefore, the data decode section 6 cannot read out data codes. When a pause operation is instructed by means of the pause signal 23, however, the data decode section 6 does not output a control code indicating stoppage of the display to the display signal generating section 7 because the section 7 must continue to operate.

As a result, the display signal generating section 7 continues generating the character display signal 26 indicative of character contents which have been generated immediately before the pause operation. In other words, the character display signal 26 in which the change of display contents is stopped is generated (steps S1 to S4).

In this situation, the same closed caption is kept to be displayed during the continuation of the pause operation on the television receiver (not shown) connected to the terminal 11 or 12. Therefore, the same closed caption can be read over and over again. When the pause operation is canceled, the VTR unit 1 outputs a video signal which caption information is multiplexed, and hence steps S1, S2 and S4 are executed so that the television receiver conducts a display in which the display contents are sequentially changed in accordance with caption information.

Figure 3:
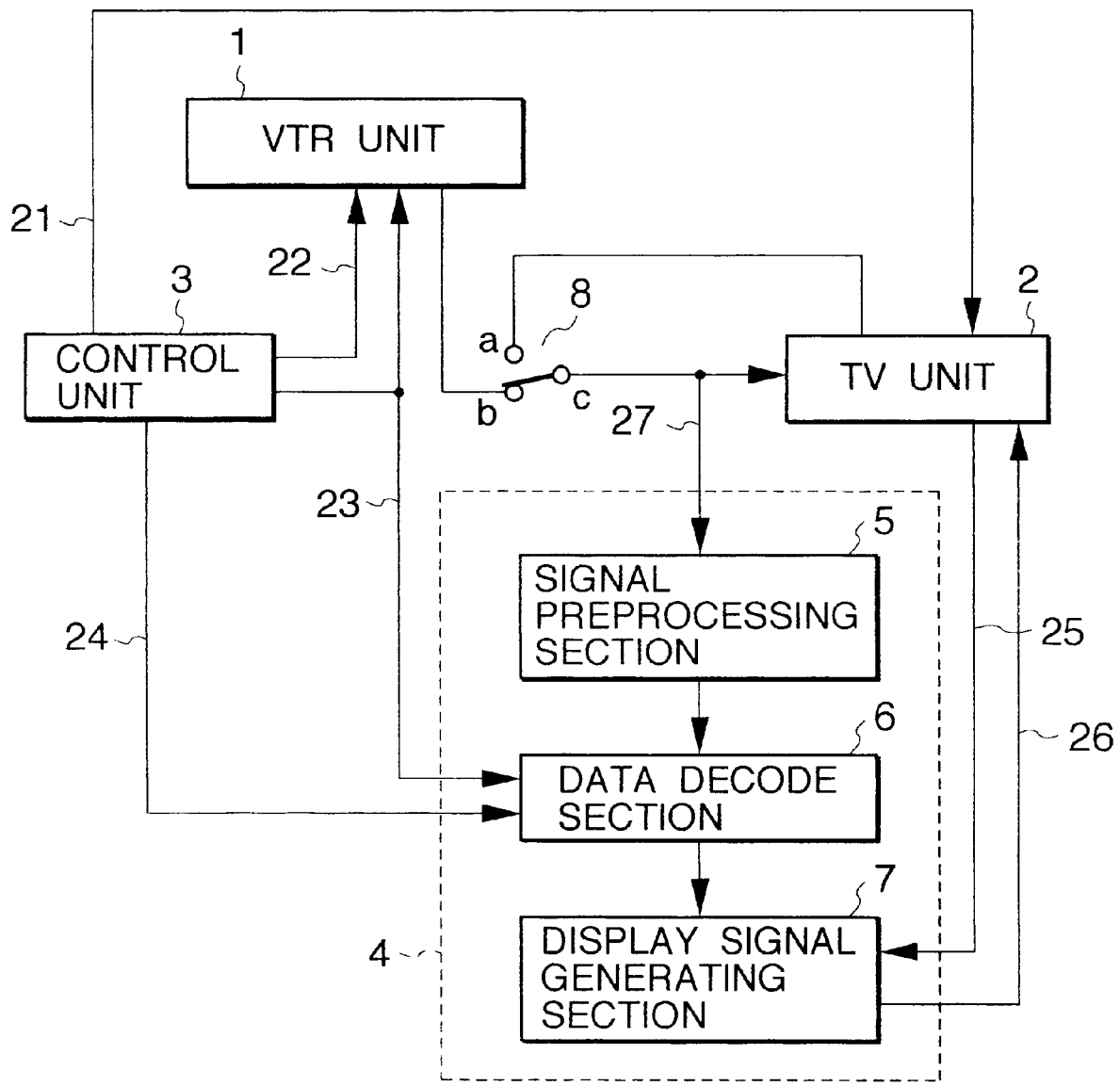
FIG. 3 is a block diagram showing the structure of a video tape recorder with a function of controlling a character display according to a second embodiment of the invention.

FIG. 3 is a block diagram showing the structure of a video tape recorder according to a second embodiment of the invention. The second embodiment is an embodiment in which the invention is applied to a television receiver with a video tape recorder incorporated therein. In FIG. 3, components which are like or equivalent to those of the first embodiment shown in FIG. 1 are designated by the same reference numerals.

In FIG. 3, the television receiver with a video tape recorder incorporated therein includes a video tape recorder (VTR) unit 1, a television receiver (TV) unit 2, a control unit 3, a character signal generator 4, and a switch 8.

The VTR unit 1 is a unit which is configured in the substantially same manner as a video tape recorder which is used as an independent apparatus, and includes a tuner, a recording/reproducing head, a video tape driving device, a recording/reproducing circuit, etc. In other words, the VTR unit 1 is configured as a unit which records a video signal on a video tape and reproduces a video tape on which a video signal is recorded. During a reproduction operation, a reproduced video signal is sent to a contact b of the switch 8.

The TV unit 2 is configured in the substantially same manner as a television receiver which is used as an independent apparatus. The TV unit 2 is a unit for receiving a commercial broadcasting and includes a tuner, a circuit for processing a video signal, a cathode ray tube (CRT), etc. The TV unit 2 sends a received video signal to a contact a of the switch 8, and displays a video signal 27 which is supplied through a contact c of the switch 8, on the CRT. When a character display signal 26 is output, characters indicated by the character display signal 26 are displayed on the CRT.

The character signal generator 4 is a unit which detects caption information from a character multiplex signal in which the caption information is multiplexed as a character signal, and generates the character display signal 26 from the detected caption information so that a closed caption is displayed in the TV unit 2. The character signal generator 4 includes a signal preprocessing section 5, a data decode section 6, and a display signal generating section 7.

The signal preprocessing section 5 is a section which, based on the video signal 27, generates signals such as a clock signal synchronized in phase with a clock run-in signal in caption information, and a signal indicating the timing of the 21st scanning line in which caption information is multiplexed, and clamps the video signal 27 at a fixed level. The generated signals and the video signal clamped at the fixed level are sent to the data decode section 6.

Based on the clock signal synchronized in phase with the clock run-in signal, the signal indicating the timing of the 21st scanning line, and the like, the data decode section 6 reads out 16-bit data codes in caption information, from the video signal clamped at the fixed level. The data decode section 6 functions also as a section which decodes the read out data codes and sends various control codes and character codes to the display signal generating section 7.

From two kinds of synchronizing signals, i.e., horizontal and vertical synchronizing signals 25 supplied from the TV unit 2, the display signal generating section 7 generates a dot clock signal which has a constant relationship in phase with the synchronizing signals 25. The display signal generating section 7 functions also as a section which, with using the generated dot clock signal as a timing reference, processes the control codes and character codes supplied from the data decode section 6, thereby generating the character display signal 26 for displaying a closed caption.

The control unit 3 is a unit which controls the VTR unit 1, the TV unit 2, the character signal generator 4, and the switch 8. Specifically, the control unit 3 controls the operation of the TV unit 2 by means of a control signal 21, and that of the VTR unit 1 by means of a control signal 22. Furthermore, the control unit 3 controls the operation of the data decode section 6 by means of a control signal 24, thereby controlling the display or non-display of a closed caption. The control unit 3 outputs a pause signal 23 to set the VTR unit 1 to a pause operation mode and also to inform the data decode section 6 of the fact that the VTR unit 1 enters the pause operation mode.

Next, the operation of the video tape recorder of the second embodiment will be described with reference to FIG. 2 described above.

When a commercial broadcasting or the like is to be received, the control unit 3 controls the switch 8 so that the contact c is connected to the contact a, and a video signal received by the TV unit 2 is displayed in the TV unit 2. When a video tape is to be reproduced, the control unit 3 controls the switch 8 so that the contact c is connected to the contact b, and a video signal reproduced by the VTR unit 1 is displayed in the TV unit 2.

In the above-mentioned reception of a commercial broadcasting and reproduction of a video tape, when the control signal 24 indicates that a closed caption is not to be displayed, the data decode section 6 gives the display signal generating section 7 a control code indicating stoppage of the generation of the character display signal 26, so that a closed caption is prevented from being displayed (step S1).

Next, the case where the control signal 24 indicates that a closed caption is to be displayed will be described.

It is now assumed that a video signal in which caption information is not multiplexed is recorded on a video tape currently reproduced by the VTR unit 1, or that caption information is not multiplexed in a commercial broadcasting received by the TV unit 2. In other words, it is assumed that the video signal 27 in which caption information is not multiplexed is output through the contact c of the switch 8.

In this situation, since it is impossible to read out data codes, the data decode section 6 judges that caption information is not multiplexed, and supplies the control code of disabling the display to the display signal generating section 7. This causes the display signal generating section 7 to stop the generation of the character display signal 26. As a result, only an image due to the received video signal or that reproduced by the VTR unit 1 is displayed in the TV unit 2 (steps S1 to S3 and S5).

Next, it is assumed that a video signal (character multiplex signal) in which caption information is multiplexed is recorded on a video tape reproduced by the VTR unit 1, or that caption information is multiplexed in a commercial broadcasting received by the TV unit 2. In other words, it is assumed that the video signal (character multiplex signal) 27 in which caption information is multiplexed is output through the contact c of the switch 8.

In this situation, data codes can be read out according to the signal from the signal preprocessing section 5. Therefore, the data decode section 6 decodes the read out data codes, and supplies control codes and character codes to the display signal generating section 7 in accordance with the result of the decoding. Consequently, the display signal generating section 7 generates the character display signal 26 corresponding to the control codes and the character codes, and these codes are supplied to the TV unit 2. In the TV unit 2, as a result, an image due to the received video signal or the video signal reproduced by the VTR unit 1 is displayed and a closed caption is superimpose-displayed (steps S1, S2 and S4).

It is assumed that the above-described operation is conducted on the basis of the video signal output from the VTR unit 1 and that, during the operation, instructions for a pause are externally input to the control unit 3 for the sake of repeatedly reading a superimpose display. In response to the input of the instructions for a pause, the control unit 3 instructs the VTR unit 1 and the data decode section 6 to conduct a pause operation, by means of the pause signal 23. The VTR unit 1 which receives the pause instructions is transferred from the reproduction operation to the pause operation, and outputs a video signal in which signals of adjacent tracks are mixed with each other, to the contact b of the switch 8. Since signals of adjacent tracks are mixed with each other, the video signal is a signal in which caption information is not multiplexed.

In this situation, the video signal 27 in which caption information is not multiplexed is supplied to the signal preprocessing section 5. Therefore, the data decode section 6 cannot read out data codes. When a pause operation is instructed by means of the pause signal 23, however, the data decode section 6 does not output a control code indicating stoppage of the display to the display signal generating section 7 because the section 7 must continue to operate.

As a result, the display signal generating section 7 continues generating the character display signal 26 indicative of character contents which have been generated immediately before the pause operation. In other words, the character display signal 26 in which the change of display contents is stopped is generated. This causes the TV unit 2 to superimpose-display a closed caption in which a string of the same characters is continuously displayed (step S1 to S4).

In this situation, the same closed caption is kept to be displayed during the continuation of the pause operation. Therefore, the same closed caption can be read over and over again. When the pause operation is canceled, the VTR unit 1 outputs a video signal which caption information is multiplexed, and hence steps S1, S2 and S4 are executed so that the TV unit 2 conducts a display in which the display contents are sequentially changed in accordance with caption information.

The invention is not restricted to the embodiments described above. In the embodiments, the character multiplex signal is a signal in which caption information is multiplexed. The invention may be applied similarly to a case of using a character multiplex signal of another kind, for example, a character multiplex signal having character codes indicative of kanji or Chinese characters and kana or Japanese syllabary.

The video tape recorder with a function of controlling a character display according to the invention includes a character signal generator which generates a character display signal based on the character multiplex signal. When a video tape recorder unit reproduces the video tape, the character signal generator generates the character display signal based on the character multiplex signal. When the video tape recorder unit is transferred from the reproduction operation to a pause operation, the character signal generator continues generating a character display signal which has been generated immediately before the transfer to the pause operation. Also when the video tape recorder unit conducts a pause operation therefore, the character display signal is kept to be generated. The character display signal generated in this case is a character display signal which has been generated immediately before the transfer to the pause operation or in which the display contents are not changed. Consequently, the change of the character display due to the character display signal can be disabled at an arbitrary time.

What is claimed is:

1. A video tape recorder with a function of controlling a character display, comprising:

a video tape recorder unit for reproducing a video tape on which a character multiplex signal is recorded;

a character signal generator including a memory for generating a character display signal based on character codes decoded from the character multiplex signal and stored in said memory during reproduction of said video tape, said character signal generator being arranged to prevent generation of said character display signal in response to a control code which is output when said character codes are not decoded from said character multiplex signal; and a control unit which, when said video tape recorder unit is transferred from a reproduction operation to a pause operation, prevents said control code from being output and thereby causes said character signal generator to continue to generate a character display signal based on said character codes stored in said memory immediately before the change to the pause operation, whereby display of characters detected in said character multiplex signal is carried out during the pause operation without employing a caption memory for storage and recall of the character display signal.

2. The video tape recorder according to claim 1, wherein said character signal generator includes a data decode section for reading out data codes from the character multiplex signal reproduced by said video tape recorder unit and decoding the data codes to output control codes and character codes, and a display signal generating section for processing the control codes and the character codes output from said data decode section to generate the character display signal.

3. The video tape recorder according to claim 1, further comprising a mixer for mixing the character multiplex signal reproduced by said video tape recorder unit and the character display signal generated by said character signal generator.

4. The video tape recorder according to claim 1, further comprising a television receiver unit which includes display means for superimpose-displaying a video signal based on the character multiplex signal reproduced by said video tape recorder unit and the character display signal generated by said character signal generator.

\* \* \* \* \*